United States Patent [19]

Messman

[11] 3,987,244

[45] Oct. 19, 1976

[54] PROGRAMMABLE IMAGE PROCESSOR

[75] Inventor: Leonard Alan Messman, Brookfield Center, Conn.

[73] Assignee: United Technologies Corporation, Hartford, Conn.

[22] Filed: Dec. 31, 1975

[21] Appl. No.: 645,845

[52] U.S. Cl. .......................... 178/7.2; 178/DIG. 1; 178/DIG. 38
[51] Int. Cl.² .......................................... H04N 7/18
[58] Field of Search ......... 178/7.2, DIG. 38, DIG. 1, 178/6.8

[56] References Cited
UNITED STATES PATENTS

| | | | |
|---|---|---|---|
| 3,590,151 | 6/1971 | Keith | 178/DIG. 38 |
| 3,958,078 | 5/1976 | Fowler et al. | 178/DIG. 1 |

*Primary Examiner*—Benedict V. Safourek
*Assistant Examiner*—Mitchell Saffian
*Attorney, Agent, or Firm*—Dominic J. Chiantera

[57] ABSTRACT

A programmable image processor compares successive vertical frames of the received video image of an object placed within a television camera field of view with a similar object video image stored in memory, and provides a signal manifestation of the video mismatches therebetween. The programmable image processor provides for the scanning of the received video image by the stored video image in one, or both, of two orthogonal directions within the camera field of view, to distinguish between video mismatches resulting from dissimilarities in the video images and mismatches resulting from the misalignment of the object in one, or both of the orthogonal directions within the camera field of view.

5 Claims, 6 Drawing Figures

PROGRAMMABLE IMAGE PROCESSOR

BACKGROUND OF THE INVENTION

1. Field of Invention

This invention relates to programmable image processors, and more particularly to programmable image processors providing for the scanning of a received video image by a stored video image in one, or both, of two orthogonal directions.

2. Description of the Prior Art

The use of video image processors to continuously sample a scene of video and to compare the sampled scenes with a reference scene, have been known in the art in the form of intrusion alarm systems. Such systems detect differences in sampled video images and provide a suitable alarm indication. These systems however are limited to fixed, or stationary object images wherein features or light and dark regions remain fixed with respect to the reference image, and are in nearly perfect alignment. In fact, it is the exact purpose of the intrusion alarm systems to provide an indication of an intrusion into the field of view recorded in the video image, by detecting just such a misalignment of imaged features. The use of such systems in other applications, such as the inspection of the finished surface detail of successive manufactured objects of the same type appearing on a production assembly line, is impractical due to the exteme difficulty in insuring exact alignment of the successive objects within the image processor field of view. The difficulty in insuring successively aligned objects would necessarily result in excessively high error indications, whose number would be a direct function of the degree of misalignment, and which would unnecessarily cause a rejection of an otherwise properly finished, or manufactured object. The allowance of a high error count threshold to compensate for an allowed degree of misalignment of successive objects, results in a reduction in the resolute ability to detect surface imperfections, or errors in the manufactured object, and therefore a risk of a low quality production yield.

SUMMARY OF THE INVENTION

An object of the present invention is to provide a programmable image processor capable of detecting video mismatches due to dissimilarities between received video images from misaligned subjects within a television camera field of view and a similar subject video image stored in memory.

According to the present invention, the received video image of a subject which is misaligned within a television camera field of view is compared with a similar video image stored in memory which is scanned across the received video image in one or two orthogonal directions within the camera field of view, to distinguish between video mismatches resulting from dissimilarities in the video images, and mismatches resulting from the misalignment of the object within the field of view in the scanned orthogonal direction. In further accord with the present invention, the stored video image is scanned across the received video image in each of two orthogonal directions within the camera field of view to further distinguish video mismatches between the video images resulting from misalignment of the subject in each of the scanned orthogonal directions in the field of view.

According still further to the present invention, the video image of a reference subject placed within the field of view of a television camera is provided by an analog video signal representative of successive vertical frames of the television raster video. Each vertical frame of the video signal is quantized into a plurality of equal time intervals, and the analog video signal amplitude in each interval is converted into a single digital bit to provide a plurality of serial digital bits for each vertical frame representative of a digital video image, and a full digital video image of the reference subject is stored in a recirculating memory. The digital video images from successive, similar subjects are compared with the stored video image over a plurality of vertical frames, beginning with a first frame during which the stored image is compared directly, one bit at a time, with the received image and the video mismatches detected, through each of the remaining plurality of vertical frames in which the stored image is delayed in successive frames by one or more bits in each horizontal raster line, to provide horizontal scanning, and/or, by a plurality of bits corresponding to one or more horizontal raster lines, to provide vertical scanning prior to comparison with the received image and detection of the video mismatches.

The programmable image processor of the present invention permits the comparison between a reference image and similar video images received from successive misaligned subjects, to provide an accurate, high speed inspection system for high yield production line facilities, wherein subjects may be inspected for surface flaws, or damage, by an automated process. The total time required for inspection of each subject is dependent on the degree, or amount of memory scanning performed, such scanning minimizing incorrect rejection errors and providing levels of quality inspection which are directly proportional to the amount of scanning performed. A selectable error mismatch allows for flexibility in determining the yield versus quality control of the inspected objects, and in all instances provides inspection quality superior to that obtainable through human visual inspection.

These and other objects, features and advantages of the present invention will become more apparent in the light of the following detailed description of preferred embodiments thereof, as illustrated in the accompanying drawings.

DESCRIPTION OF THE PREFERRED EMBODIMENT

Figure 1:
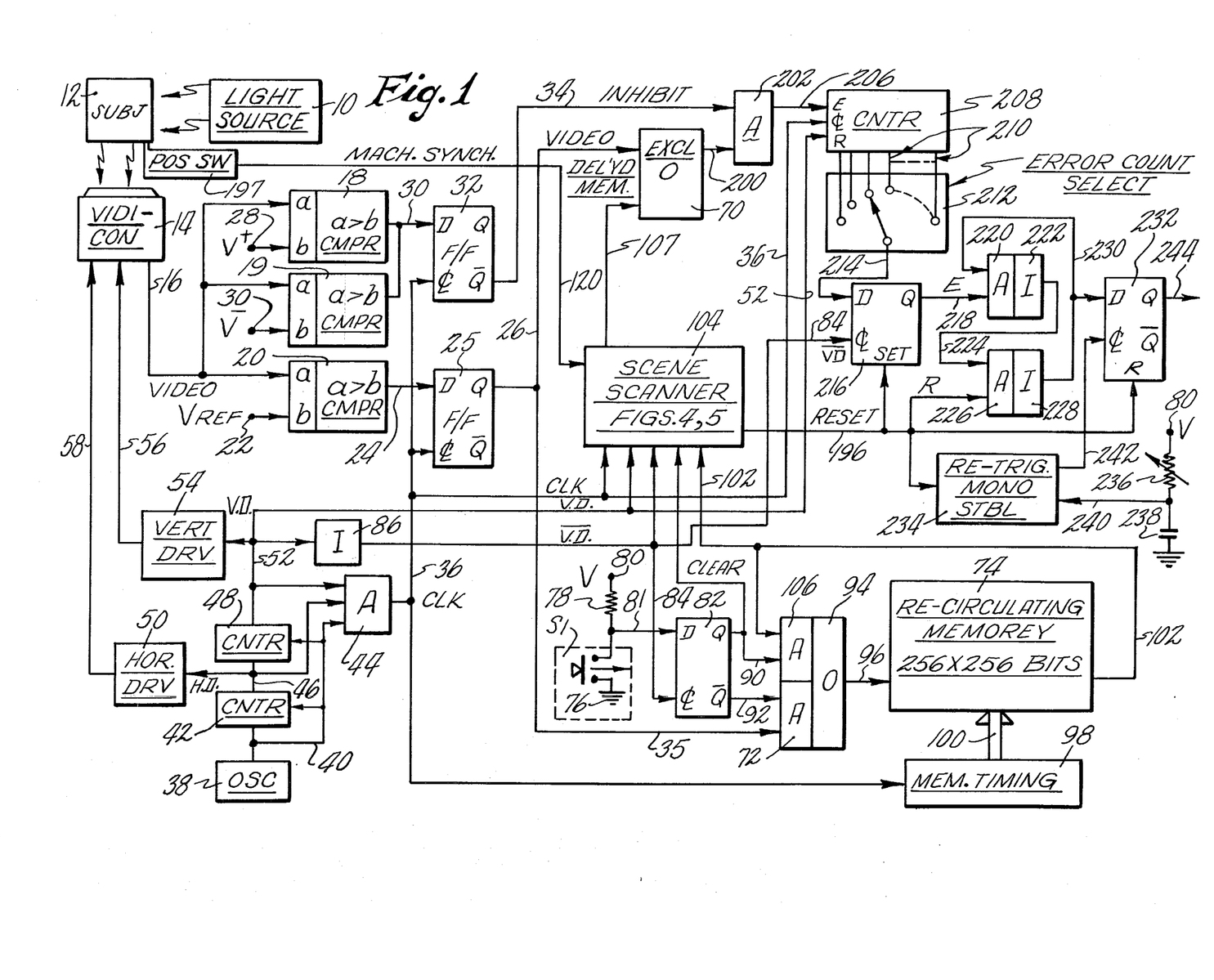
FIG. 1 is a schematic block diagram of a programmable image processor according to the present invention.

Referring now to FIG. 1, in a programmable image processor (PIP) according to the present invention, a light source 10 provides surface illumination of a subject 12, such as a manufactured article on a production assembly line, and a television camera 14, such as a vidicon tube type, records the video image of the subject. The camera 14 provides a continuous, amplitude modulated analog signal on a line 16 representative of the light intensity of successive portions of the video image provided by the camera raster pattern. The camera raster pattern, as described more fully hereinafter, comprising a plurality of horizontal lines in each of a plurality of vertical frames, each vertical frame providing a full video image of the view surface of the subject 12. The amplitude of the analog video signal on the line 16 is substantially linear with respect to the image light intensity, the voltage value on the line 16 decreasing from a maximum to a minimum as the intensity of the image changes from absolute lightness through varying shades of gray to maximum darkness. The video signal on the line 16 is presented to comparator circuits 18 through 20. The comparator 20 compares the video signal on the line 16 with a reference voltage 22, and provides a logic one signal through a line 24 to a bistable means 25, such as a D type flip/flop, whenever the amplitude of the line 16 video signal exceeds the value of the reference voltage 22, the signal on the line 24 being at a logic zero for all other amplitudes. The comparator 20 in combination with the reference voltage 22, and bistable means 25 (which quantizes the signal on the line 24 into system clock intervals, as described hereinafter) function as a one bit analog-to-digital converter, providing a plurality of serial digital bits for each successive vertical frame which together provide a digital video image of the object 12, on a line 26. Since the video images from successive similar subjects will ideally appear the same, and since the function of the programmable image processor is to compare the images received from such similar subjects, the loss of fidelity of the light intensity of the subject video image through the conversion of the analog video signal into a plurality of single bit digital signals, has no effect on system accuracy, or sensitivity.

The video signal on the line 16 is also compared in comparators 18, 19 to a high threshold voltage 28 and a low threshold voltage 30, which represent voltage values above and below the value of the reference voltage 22, to provide a discrete logic one signal on a line 30 whenever the amplitude of the line 16 video signal is between that of the threshold voltage amplitudes, and a logic zero signal for all other amplitudes. The signal on the line 30 is presented to a bistable means 32, identical to that of the bistable 25, to provide a quantized signal on a line 34 which is synchronized with the system clock signal (CLK) appearing on a line 36.

The system timing for the PIP is provided by an oscillator 38 which provides a high frequency signal on a line 40 to a binary counter circuit 42, and to an AND gate 44. The counter circuit 42 divides down the high frequency signal on the line 40 to provide a lower frequency gate signal which is presented through a line 46 to a second binary counter circuit 48, a second input to the AND gate 44, and to a horizontal driver circuit 50. The counter circuit 48 counts the gate signal on the line 46 to provide a lower frequency gate signal through a line 52 to a third input of the AND gate 44, and to a vertical driver circuit 54. The gate signals on the lines 46, 52 from the counter circuits 42, 48 have non-symmetrical on-off times to provide a corresponding non-symmetrical trace and retrace portion for the camera 14 horizontal and vertical deflection signals respectively. The counters 42, 48 provide the non-symmetrical gates in a manner known in the art, which includes the use of one or more binary counters for counting the input signal to provide a terminal count indication to a preset high bistable device to reset the bistable low, and to a decode device which, at the completion of an additional determined count above the threshold count, again presets the bistable high and resets the counter to zero to begin a new cycle. The gate signal is provided by the output of the bistable and the relationship of the terminal count to the additional count determines the non-symmetry of the traces and retrace portions of the deflection signals.

The vertical and horizontal drivers 54, 50 provide the respective gate signals through lines 56, 58 to the horizontal and vertical deflection signal circuits of the camera 14, to provide synchronization of the camera deflection signals with the PIP clock signal. The signal on the line 52 is the vertical deflection (VD) gate signal and is typically at a frequency of 60 Hz, while the signal on the line 46 is the horizontal deflection (HD) gate signal, and is at a frequency deteremined by the desired number of horizontal lines in the raster pattern.

The AND gate 44 provides the clock signal on the line 36 which is equal in frequency to the oscillator 38 signal on the line 40, and which is present on the line 36 only during the trace portions of the horizontal and vertical sweep signals (the retrace portion of the gate signals on the lines 46, 52 providing a logic zero to disable the AND gate 44). This insures that PIP processing is in exact synchronization with the trace video image of the television camera 14. The frequency of the oscillator 38, is determined by the selected resolution of the PIP, i.e., the total number of bits per horizontal scan, as described in detail hereinafter with respect to FIGS. 2 and 3.

Figure 3:
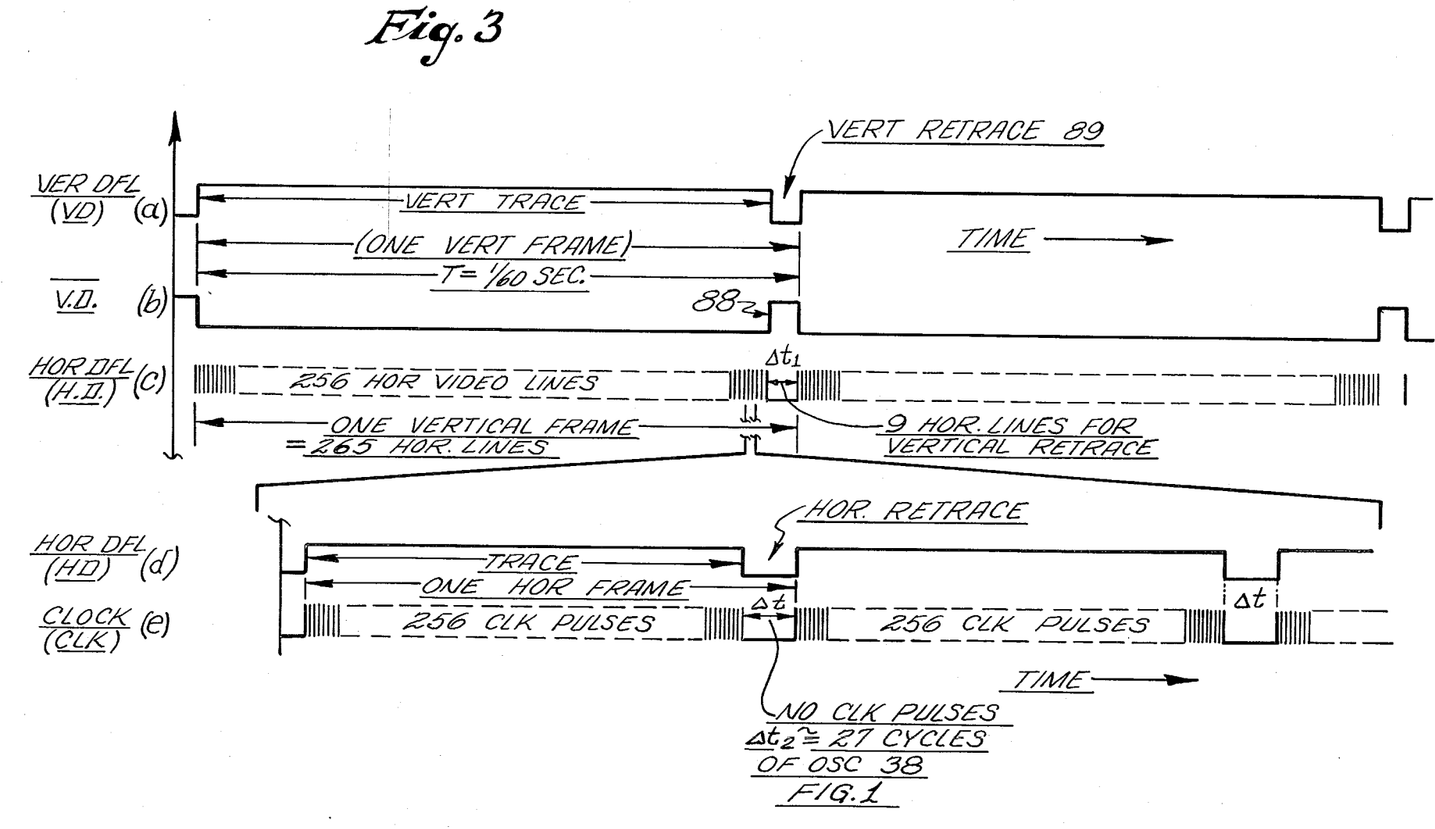
FIG. 3 is a timing diagram of a portion of the embodiment of FIG. 1.

Referring now to FIG. 3, the vertical deflection signal on the line 56 (FIG. 1) has a period (T) of approximately 1/60 second and each period is comprised of a trace portion and a retract portion which together comprise a single, vertical frame, as shown in FIG. 3, illustration ($a$). The resolution of the video image recorded is dependent on the number of horizontal lines provided in each trace portion of the vertical deflection period. For the embodiment of FIG. 1, a total of 256 horizontal lines were selected for each vertical frame trace portion, as shown in FIG. 3, illustration ($c$). The time duration of the vertical retrace portion, labeled $\Delta t_1$ in illustration ($c$), is equivalent to that required for nine horizontal lines, such that the total number of horizontal lines occurring in each vertical frame (1/60 seconds) is 265, and for the embodiment of FIG. 1, the frequency of the horizontal deflection signal on the line 58 (FIG. 1) is approximately 15,900 Hz. Each horizontal deflection period is comprised of a trace portion and a retrace portion similar to that of the vertical period, as shown in FIG. 3, illustration ($d$). The video signal on the line 16 (FIG. 1) corresponding to the trace portion of each horizontal deflection cycle is quantized into a number of time intervals, the total number of intervals per trace portion determining the horizontal resolution. For the embodiment of FIG. 1, the trace portion of the horizontal deflection cycle is quantize into 256 intervals corresponding to 256 cycles of the clock signal on the line 36, as shwon in FIG. 3 illustration ($e$). The horizontal deflection retrace portion, labeled $\Delta t_2$ in illustration ($e$), has a time interval equivalent to 27 clock pulses, although no clock pulses appear on a line 36 due to the operation of the AND gate 44 which inhibits the clock signal on the line 36 during the retrace portion of the horizontal deflection signal on the line 46. Therefore, each vertical deflection cycle (trace plus retrace) is equivalent to 74,995 clock pulses (265 equivalent horizontal deflections times 283 equivalent clock pulses per horizontal deflection) occurring in a period of 1/60 of a second such that the frequency of the oscillator signal on the line 40 is approximately equal to 4.5 MHz. As stated hereinbefore, the AND gate 44 (FIG. 1) prevents clock pulses from appearing on the line 36 during the retrace portions of both the vertical deflection and horizontal deflection signals, therefore, the total number of clock pulses occurring during each complete vertical deflection cycle is 65,536 (256 horizontal deflections times 256 clock pulses per horizontal deflection), such that one vertical frame of camera video on the line 16 is quantized into 65,536 serial digital bits on the line 26.

Figure 2:
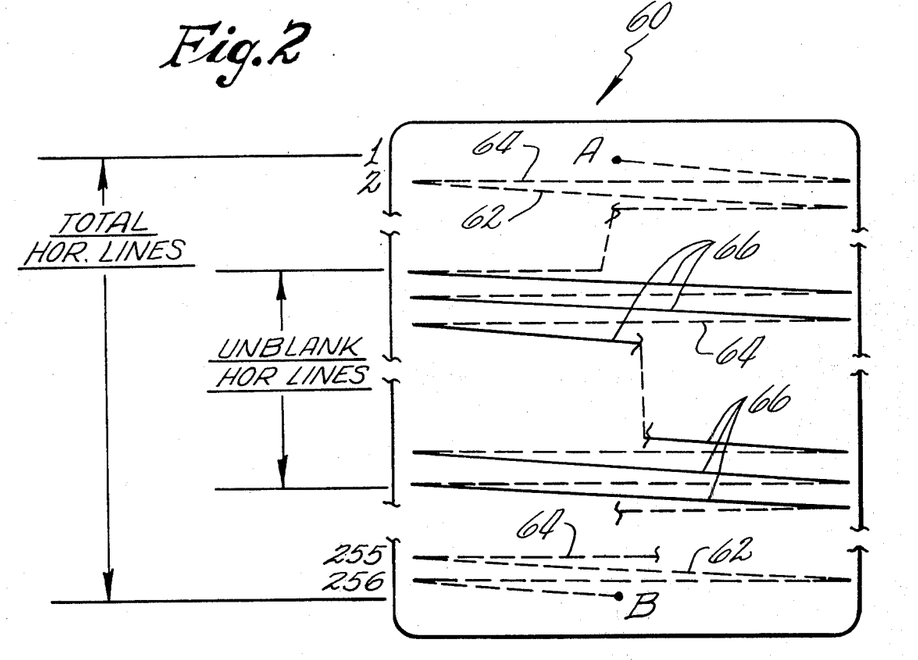
FIG. 2 is an illustration of a television raster pattern used in the FIG. 1 embodiment of the present invention.

An illustration of the television camera 14 (FIG. 1) raster pattern 60 is shown in FIG. 2, wherein the total number of 256 horizontal deflections may be divided into blanked and unblanked video portions as may be required in a given system configuration. The horizontal deflection signals being blanked for both the trace 62 and retrace 64 portions of the horizontal deflection cycle during the blank video portion, whereas the trace portion 66 provides video information during the unblank video portion, the retrace portion 64 remaining blanked.

The digital signal on the line 26 is presented to one input of an exclusive OR circuit 70, and to one input of an AND gate 72. In order that the PIP may be used to compare the video image of successive subjects to the video image of a reference subject, the video image of the reference object is received and stored in a recirculating memory 74. The selected digital video image reference signal on the line 26 is presented to the memory 74 whenever switch $S_1$ is depressed. Switch $S_1$, which may be a single pole, double throw type well known in the art, is spring loaded, requiring a depress to close the contacts which are connected on one side to ground 76, and on the other side through a resistor 78 to a voltage source 80. The junction of the switch $S_1$ and the resistor 78 is presented to the input of a bistable means 82 which also receives the inverted vertical deflection signal ($\overline{VD}$) (FIG. 3, illustration (b)) on a line 84 from an invert gate 86.

In the operation of loading the video image of a selected reference subject into the memory 74, the reference subject is placed within the camera 14 field of view, and aligned within the uppermost left hand portion of the field of view. Such alignment may be facilitated through the use of a television monitor for displaying the camera video signal on the line 16. After alignment of the subject, switch $S_1$ is depressed providing a logic zero signal on line 81. The next succeeding rising edge of a $\overline{VD}$ signal (88 in FIG. 3, illustration (b)) which represents the beginning of a retrace portion (89 in FIG. 3, illustration (a)) of the VD period causes the bistable 82 to clock the logic zero signal on the line 81 to the bistable normal output on a line 90, while a simultaneous logic one signal is provided on the bistable inverted output, on a linee 92. The signal on the line 92 is presented to a second input of the AND gate 72, enabling the gate to allow the pluality of digital bits on the line 26 representing the reference digital video image to pass through to an OR gate 94, which presents the serial digital bits through a line 96 to the input of the recirculating memory 74. The digital bits on the line 96 are clocked into the memory on successive line 36 clock pulses, a total of 65,536 clock pulses being required to enter a full vertical frame video image into the memory. The logic one enable signal remains on the line 92 until the appearance of the first $\overline{VD}$ rising edge following the release of S, causing transition of the bistable 82 and line 92 enable signal during the retrace portion of the vertical frame, and ensuring that the last full vertical frame of video image is entered into the memory.

The memory 74 is a serial first in/first out memory, with provisions for parallel processing of the signal internal to the memory, in a manner known in the art, to insure processing of 65,536 bits within the vertical frame time of 1/60 of a second. Such a memory may comprise a plurality of serial in/serial out shift registers connected in a series, parallel combination as described in the *Advanced Micro Devices Data Book* pages 8-74 to 8-80, published 1974 by Advanced Micro Devices, Inc. Timing control of the memory 74 is provided by a memory timing circuit 98 which receives the clock signal on the line 36 and which provides, through the lines 100 to the memory 74, the two phase clock signal, the latching clock signal and the multiplex decode signals required in a recirculating memory embodiment having internal parallel processing.

The output of the recirculating memory 74 is presented through a line 102, to a scene scanner circuit 104, and to one input of an AND gate 106. The AND gate 106 also receives the normal output of the bistable 82 on the line 90, and provides an output signal to the second input of the OR gate 94. The combination of the AND gates 72, 106, and the OR gate 94 function as an electronic switch for selecting either a digital video signal on the line 26 for storage in the memory 74 when $S_1$ is depressed and causing the plurality of digital bits of the stored digital video image to recirculate through the memory 74 on successive vertical frames when $S_1$ is not depressed. When $S_1$ is depressed to store a digital video image in memory the logic zero signala on the line 90 provides an inhibit to the AND gate 106, and continues to do so until the first $\overline{VD}$ rising edge following the release of $S_1$, at which time the signal on the line 90 transitions to a logic one, enabling the AND gate 106 and allowing the serial digital bits stored in the memory to recirculate through the line 102, the AND gate 106, the OR gate 94, the line 96 and the memory 74 on successive line 36 clock pulses. A full recirculation of the total number of memory digital bits occurring for each successive digital video image vertical frame on the line 26, during which time the stored digital bits are compared, one bit at a time, to the received video digital bits on the line 26, as described in more detail hereinafter.

Figure 4:
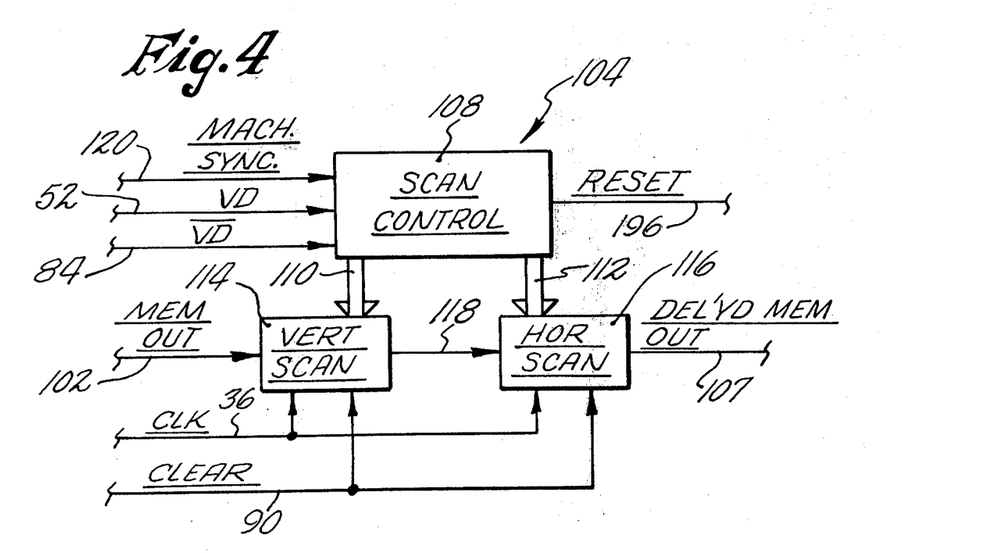
FIG. 4 is a schematic block diagram of a portion of the FIG. 1 embodiment of the present invention.

The scene scanner 104 receives the digital video image from the memory 74 on the line 102, and provides this data through the line 107 to the exclusive OR gate 70. The scanner 104, shown in block diagram in FIG. 4, is comprised of a scan control circuit 108, which provides control gate signals through lines 110, 112 to a vertical scan delay circuit 114, and a horizontal scan delay circuit 116. The scan control 108 provides the control gate signals in response to received signals, including: the vertical deflection signal (VD) on the line 52, the inverted vertical deflection signal ($\overline{VD}$) on the line 84, and a machine synchronization signal on a line 120, which is generated coincident with the positioning of each successive object 12 within the field of view of the television camera 14. The vertical scan delay 114 and the horizontal scan delay 116 each receive the clock signal on the line 36, and the signal from the normal output of the bistable 82 on the line 90, and each provide compensation for the respective vertical and horizontal misalignment of the inspected workpiece within the camera 14 field of view, as described with respect to the detailed embodiment of the scene scanner in FIG. 5.

Figure 5:
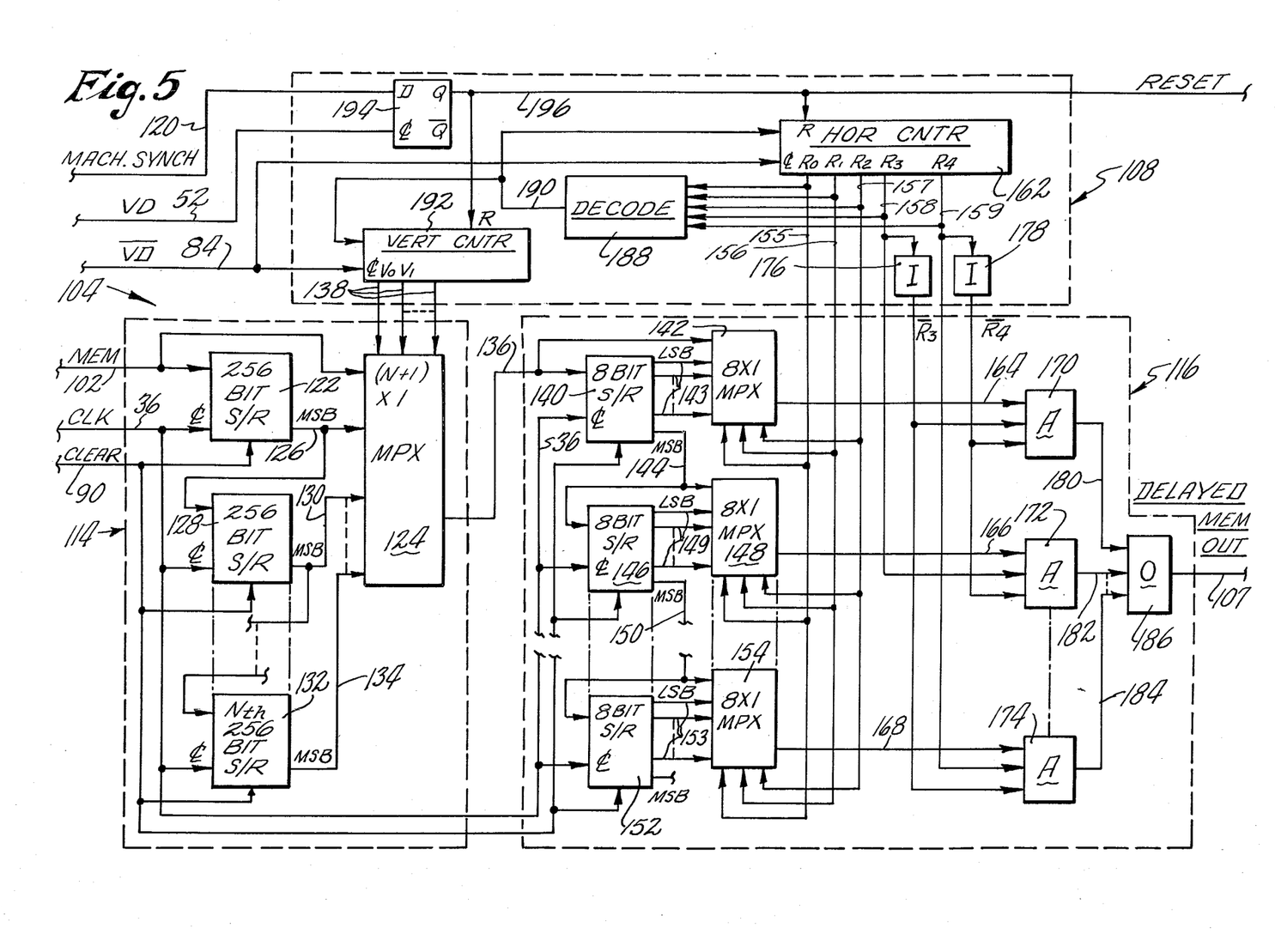
FIG. 5 is a detailed schematic of the block diagram of FIG. 4.

Referring now to FIG. 5, in an exemplary embodiment of a scene scanner according to the present invention, the digital bits from the recirculating memory 74 (FIG. 1) on the line 102, are presented to the vertical scan delay circuit 114 at the input of a serial 256 bit shift register 122, and at one input of a multiplexer (MPX) 124. The shift register 122 is a serial in/serial out 256 bit type known in the art, such as one quarter of a National Semiconductor MM1402, Quad 256 bit shift register. The shift register 122 receives the clock signal on the line 36, and the serial memory digital bits on the line 102 are shifted through the register on successive clock pulses, such that at the end of 256 clock pulses the first full horizontal frame of the digital video image stored in the memory 74 is contained within the register 122, and the register most significant bit (MSB) is set with the first of the 256 memory bits presented on the line 102. The MSB of the register 122 is presented through a line 126 to a second input of the MPX 124, and to the input of a second shift register 128, which is identical to the register 122 and which also receives the clock signal on the line 36. The 256 memory data bits from the shift register 122, are clocked through the register 128 with the 256 clock pulses of the next succeeding full horizontal frame, after which the MSB of the register 128 is set with the first of the memory digital bits. The MSB of the register 128 is similarly connected through a line 130 to a third input of the MPX 126, and to the input of the next 256 bit shift register. The total number of 256 bit registers required, corresponds to the number of horizontal line delays desired, such that for N horizontal line delays, N registers are required. The Nth shift register, 132 has its MSB connected through a line 134 to the (N+1) input of the MPX 124. The MPX selects one of the inputs for presentation on a line 136 in dependence on multiplexer switching signals provided by the scan control 108 on lines 138.

In a system having both vertical and horizontal scan delays, the output of the vertical scan circuit is presented through a line 136 to a shift register 140 and to one input of an MPX 142 within the horizontal scan circuit 116. The shift register 140, a serial in/serial out type known in the art, receives the clock signal on the line 36 and shifts the memory digital bits on the line 136 through successive register outputs provided through the lines 143 to successive inputs of the MPX 142, in one bit steps from the least significant bit (LSB) to the MXB on a line 144, the number of clock pulses required to fill the register being equal to the bit capacity of the shift register. In the embodiment of FIG. 5, the register 140 has an eight bit capacity and after eight clock pulses the first digital bit presented on the line 136 appears at the MSB of the register 140 on the line 144. The MSB on the line 144 is presented to the inputs of a second, similar register 146, and a second MPX 148, identical or the MPX 142. The first eight digital bits from the line 136 are shifted through successive register outputs provided through the lines 149 to successive inputs of the MPX 148, with the next eight clock pulses from the line 36, such that after sixteen clock pulses, the MSB of register 146 on the line 150 contains the first digital bit presented on the line 136. The MSB on the line 150 is similarly presented to an identical third shift register and MPX, the total number of shift registers required being determined by the number of horizontal bit delays desired, such that for M number of registers, the total horizontal bit delay is equal to ($M \times 8$ bits)-1 (the MSB of the Mth register is not used). The Mth register 152 receives the MSB of the immediately preceding register (146 in FIG. 5) and presents its outputs through the lines 153 to successive inputs of an MPX 154. In the embodiment of FIG. 5, each MPX has a switching capacity of eight to one.

The MPX switching gate signals are provided by gate signals $R_0$–$R_4$, presented on lines 155–159 from a binary counter 162 within the scan control circuit 108. The lines $R_0$–$R_2$ present to each MPX, a total of eight discrete switching states, to uniquely select one of eight inputs for presentation on the output line of the MPX. The outputs of the MPX's 141, 148, 154 are presented through lines 164, 166, 168 to one input of respective AND gates 170, 172 and 174. Each of the AND gates receives two of the four signals $R_3$, $\overline{R_3}$, $R_4$ and $\overline{R_4}$ provided by the scan control 108, the $\overline{R_3}$ and $\overline{R_4}$ signals being provided through INVERT gates 176, 178 from the $R_3$ and $R_4$ signals on the lines 158, 159. The AND gate 170 receives the $\overline{R_3}$ and $\overline{R_4}$ signals, the AND gate 172 receives the $R_3$ and $\overline{R_4}$ signals, and AND gate 174 receives the $\overline{R_3}$ and $R_4$ signals. The outputs of the AND gates 170, 172, 174 are presented through lines 180, 182 and 184 to an OR circuit 186, the output of which is presented to the output of the scanner on the line 107.

The output lines $R_0$ and $R_4$ on the lines 155-159 are also presented to a decode circuit 188 within the scan control, which provides a signal on a line 190 to an input of the counter 162 and to one input of a binary counter 192. The signal on the line 190 is a periodic pulse generated by the decode circuit 188 at the completion of a selected terminal count value from the horizontal coutner 162, the terminal count value being equal to the number of horizontal bit delays selected. Each successive pulse is counted by the vertical coutner 192, and the binary count presented through the lines 138 to the multiplexer 124, to provide the switching control of the MPX 124, as described hereinafter with respect to FIG. 6.

The scan control circuit 108 also comprises a bistable means 194 which receives the machine synchronization pulse on the line 120, and the VD signal on the line 52. The machine synch pulse, generated from a position switch 197 (FIG. 1) at the initial positioning of the subject 12 within the field of view of the camera 14 causes the output of the bistable 194 on a line 196, to a transition to a logic zero at the VD rising edge immediately following the appearance of the synch pulse, the bistable means providing a "debounce" of the machine synch pulse to remove position switch noise. The output signal of the bistable 194 on the line 196 provides a reset gate signal which is presented to the counters 192, 162, to reset each to a zero count state at the initial positioning of the subject 12.

Figure 6:
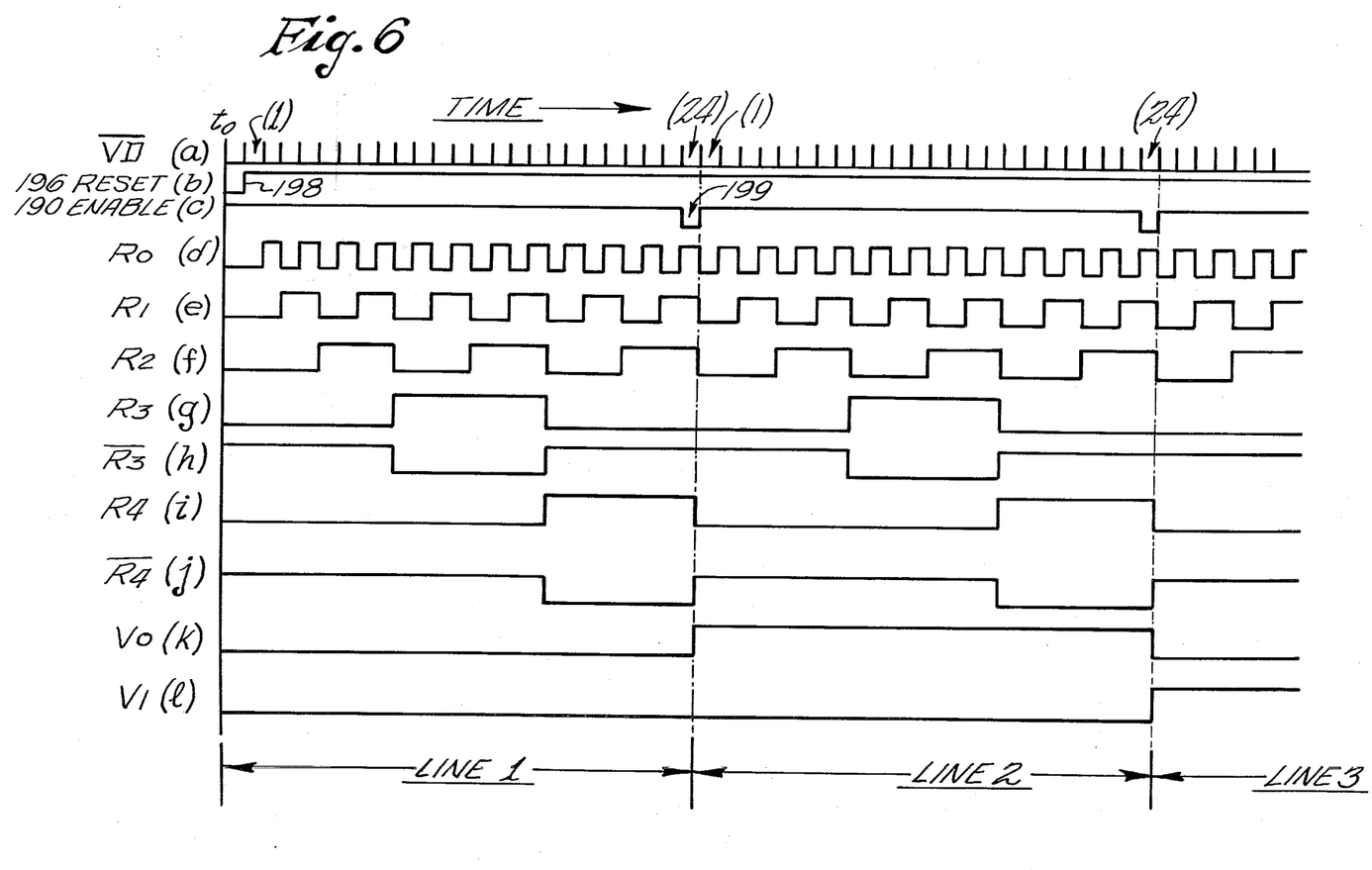
FIG. 6 is a timing diagram of a portion of the embodiment of FIG. 5.

In the operation of the scene scanner, the placement of a subject 12 (FIG. 1) within the camera 14 field of view causes the position switch 197 (FIG. 1) to provide a machine synch pulse to the bistable 194, which in turn provides a reset pulse (198 FIG. 6, illustration (b)) on the line 196 which resets the counters 162, 192 to a zero count (FIG. 6 illustrations (d)–(g), (i), (k) and (l)) at time $t_0$. Following the removal of the reset pulse, the counter 162 counts the rising edges of successive $\overline{VD}$ cycles (FIG. 6, illustration (a)) which correspond to the completion of the trace portion of successive vertical frames of the digital video image on the line 26. After the first $\overline{VD}$ rising edge following the removal of the reset pulse (interval (l) of FIG. 6, illustration (a)), the counters 162, 192 are at a zero output count. With the signals $R_0$–$R_2$ at a zero count, and $\overline{R_3}$ and $\overline{R_4}$ both at a logic one, the MPX 142 connects the line 136 through the line 164 to the AND gate 170 which is gated on, allowing the memory data to pass through to the line 180, the OR gate 186 and the output line 106. Similarly, the signals $V_0$, $V_1$ (FIG. 6, illustrations (k) (l)) are at a zero count and the MPX 124 connects the output signal line 102 of the memory 74 directly to the line 136. This allows the first digital bit, of the first horizontal line, of the digital video image signal stored in the memory 74 to appear on the line 107 without a delay, and at a line 36 time interval coincident with the first bit, of the first horizontal line, of the first vertical frame of the digital video image presented on the line 26 after positioning of the subject 12, and the full vertical frame of the memory digital video image is conducted, without delay, to the exclusive OR gate 70. The next succeeding $\overline{VD}$ edge increments the LSB of the counter 162 ($R_0$) to the one count, causing the MPX 141 to select the LSB of register 140 for presentation to the line 164. This corresponds to a one bit horizontal delay resulting from the one line 36 clock pulse required to transfer the first memory data bit from the line 136 to the register 140 LSB. Therefore, the first memory digital bit appears on the line 107 at a time interval coincident with the appearance of the second digital bit of the next vertical frame of the digital video image on the line 26 and the full vertical frame of memory data is delayed by one horizontal bit. The process is continued for successive line 26 vertical frames, through a binary count of seven on the lines $R_0$ through $R_2$, the MPX 142 sequentially selecting, on each successive vertical frame, the successively more significant bits of the register 140 for presentation to the output line 107, providing a cumulative bit delay which is increased by one digital bit for each successive vertical frame. Since the lines $R_0$–$R_2$ are simultaneously presented to MPX 148 and 154, they also provide sequential selection of their input lines, however, the AND gates 172, 174 are inhibited through the first binary count of seven on the lines $R_0$–$R_2$. At the count of eight: the lines $R_0$–$R_2$ are recycled to zero, $R_3$ is set to a one, AND gates 170, 174 are inhibited, and AND gate 172 is enabled. The input lines to the MPX 148 (MSB of register 140 to the MSB-1 of register 146) are sequentially presented to the output line 106. At the count of 16, the process is repeated with MPX 154 and AND gate 174 providing the function. If, for the embodiment of FIG. 5, only three registers 140, 146, 152 are used then a total horizontal bit delay of 23 is provided, after which, at the count of 24 the counter 162 is reset by the decode circuit 188, and the horizontal delay restarts. If viewed on a monitor, the effect of the horizontal delay is the slow drift of the raster pattern from left to right through 23 vertical frames, and the snap back on the 24 frame.

Prior to the terminal count of 24 of counter 162, the vertical counter 192 is at a zero count, and the memory digital video image on the line 102 is presented directly to the horizontal scan circuit 116, with no vertical delay. At the count of 24, the pulse (199, FIG. 6, illustration (c)) provided by the decode circuit 188 on the line 190 to reset counter 162, simultaneously increments the LSB of the counter 192 ($V_0$) to a one count (FIG. 6, illustration (k)), causing the MPX 124 to select the MSB of register 122 for presentation of the line 136. As described hereinbefore, the MSB of the register 122 receives the first line 102 memory bit after a delay of 256 clock pulses from the time the first bit is presented, which is equivalent to the full trace portion of one horizontal line (as shown in FIG. 3, illustration (d)) and the 25 vertical frame of memory data appears on the line 136 after a full horizontal line delay. The horizontal scan circuit 116, having been reset to a zero count, repeats the process hereinbefore described, to provide an additional 23 horizontal bit delay for the one horizontal line delay provided by the vertical scan circuit 114. The process continues through the selected number of horizontal line delays provided by the vertical scan delay, as shown in FIG. 6 generally. If, in the embodiment of FIG. 5 the vertical scan delay 114 includes only three 256 bit shift registers and the horizontal scan delay includes three 8 bit shift registers, the scanner provides zero to three horizontal lines of delay with 0 to 23 bits of delay for each horizontal line, the first memory digital bit appearing at the output of the scanner on the line 107 at a time interval coincident with a successively higher digital bit of the received digital video image on the line 26, as follows:

| VERT. FRAME | HOR. LINE | HOR. BIT |
| --- | --- | --- |
| 1 | 1 | 1 |
| 2 | 1 | 2 |
| 3 | 1 | 3 |
| . | . | . |
| 24 | 1 | 24 |
| 25 | 2 | 1 |
| 26 | 2 | 2 |
| . | . | . |
| 48 | 2 | 24 |
| 49 | 3 | 1 |
| . | . | . |
| 96 | 4 | 24 |
| 97 | 1 | 1 | the total scan taking place over 96 vertical frames at a scan time of 1.53 seconds (96 frames ×1/60 second/frame). The effect of delaying the memory digital video image in cumulative 1 bit increments on successive vertical frames, is to provide a scanning of the received video image by the memory video image for a limited offset in both the horizontal and vertical directions. This permits the detection of video mismatches between the two images which result from true dissimilarities between the subjects, rather than a mismatch due to misalignment error of the subject within the horizontal and vertical limits of the scan.

The quantative effect, of the combined vertical and horizontal delays of the memory image when viewed on a television monitor, is the appearance of an image drifting slowly in the vertical direction from the top of the raster pattern to a horizontal line corresponding to the number of delayed horizontal lines selected, after which the image snaps back to the top of the screen, while simultaneously the image drifts from left to right in the horizontal dimension at a more rapid drift rate, snapping back from right to left at the completion of the designated number of horizontal bit delays for each horizontal line delay.

It should be noted, with respect to FIG. 5, that the delays provided by the scan circuits may be implemented independently, such that an image processing system may use either one alone if appropriate measures are taken to ensure alignment of the successive subjects in the direction for which scanning is not provided. Elimination of the vertical scan circuit 114 is provided by connecting line 102 directly to line 136, whereas the horizontal scan delay 116 is eliminated by connecting line 136 directly to line 107.

Referring again to FIG. 1, the output signal of the scene scanner on the line 107 is presented to one input of the exclusive OR circuit 70 which compares, one bit at a time, the delayed memory signal on the line 106 to the received video signal on the line 26, and provides on a line 200 a discrete logic signal for each bit of mismatch between the two images. The logic signal on the line 200 is presented to an AND gate 202 which also receives the inhibit signal on the line 34 from the bistable means 32. The inhibit signal, as described hereinbefore, is generated whenever the analog video signal on the line 16 is within a tolerance band around the value of $V_{ref}$ 22, and provides an inhibit to the AND gate 202 during this time to prevent a false error count from being recorded. The AND gate 202 presents each bit mismatch signal, through a line 206 to a counter 208, which also receives the clock signal on the line 36, and the vertical deflection signal (VD) on the line 52. The counter has a sixteen bit capacity, capable of counting to 65,536 which corresponds to the total number of video bits in one vertical frame. The count is controlled by the line 36 clock signal, and the counter is reset by the VD signal on the line 52 following each vertical frame. The binary count of the counter 208 is presented on output lines 210 to an error count select circuit, such as a switch 212, each output line of the counter 208 being presented to a different contact on the select switch 212. The switch 212 allows the selection of the threshold, or max number of mismatches which will be allowed before a general reject order is generated. The use of a switch 212 only allows for error threshold resolution which differ by powers of two, however, suitable decode circuitry known in the art may be used to provide one bit resolution.

The output of the switch 212 on a line 214 is presented to the input of a bistable device 216, such as a Δ type flip flop, which also receives the clock signal on the line 36, and the reset signal on the line 196 from the scanner 104. The bistable 216 is set high by the rising edge of the reset signal following the placement of a subject within the camera 14 field of view (as described hereinbefore with respect to FIG. 5), and presents a logic one signal through a line 218 to one input of an AND gate 220, the output of which is presented through an invert gate 222 and a line 224, to one input of an AND gate 226, which receives at a second input the reset signal on the line 196. The output of the AND gate 226 is presented through an invert gate 228 and a line 230 to the input of a bistable means 232, and to a second input of the AND gate 220. The reset signal on the line 196 is also presented to a reset input of the bistable 232 and to an input of a retriggerable monostable 234, of a type well known in the art, which provides, after a time delay whose magnitude depends on the total scan time of the system, a signal to the clock input of the bistable 232. The delay time constant is provided by a series combination of a resistor 236 and capacitor 238 connected to a voltage source 80, with the junction of the resistor, and capacitor connected through a line 240 to the monostable.

The combination of the bistable 216, the AND gates 220, 226, and the invert gates 222, 228 provide a resettable latch function fro detecting and holding a video bit mismatch count less than that of the maximum threshold selected by switch 212, which may occur during the scanning and comparison of the memory digital video image with the received video image. In operation, a subject 12 placed within the field of view of the camera 14 initiates the reset pulse on the line 196 which resets the counter 208, and the rising edge which follows the reset pulse sets the bistable 216 to provide a logic one on the line 218, and initiates the time delay of the monostable 234. The logic one level on the line 196 following the reset pulse enables the AND gate 226, which in combination with the invert gate 222 functions as a NAND gate to provide a logic one on the line 230. On each of the vertical frames following reset, the scanner provides the effective scanning of the line 26 digital video image by the memory video image, as described hereinbefore. The counter 208 counts the number of video mismatches in each vertical frame (the counter is reset after each frame by the retrace portion of the VD signal on the line 52), and if the number exceeds the threshold value selected by the switch 212, a logic one appears on the line 214 and is clocked through the bistable 216 on the $\overline{VD}$ edge which indicates the completion of a vertical frame. Therefore, the line 218 remains at a logic one level for each vertical frame in which a logic one appears on the line 214. If at the completion of the scanning time period (which equals the delay period of the monostable 234) the line 218 has remained at a constant logic one level, the line 230 will likewise be at a logic one, and the output signal from the monostable 234 clocks the one on line 230 through the bistable 232 to the line 244 indicating a failure. If, during one of the vertical frames of the scanning period, the error threshold of switch 212 is not exceeded, a logic zero is clocked through the bistable 216 at the completion of that frame. The logic zero on line 218 immediately sets the line 230 to a zero, and regardless of the transition of the line 218 to a logic one on some following frame, the line 230 remains at a zero for the remaining scan period. At the completion of the scan period the monostable clocks the zero signal through the bistable 232 to the line 244 indicating a pass.

The programmable image processor of the present invention provides a flexible, high speed, video image comparison process which is ideally suited for inspection of the surface image of manufactured workpieces, or any such similar subjects requiring inspection for surface imperfections. The PIP allows for instant reprogramming of the referenced video image at any time, alllowing for immediate changes in the inspected subject or to allow for acceptable changes in the inspected subject surface. The system permits misalignment of successive subjects within the field of view of the television camera, in either one or two orthogonal directions, by providing a scanning reference video image in each of the two directions. Similarly, the system scanning function may be reduced to a scan in only one direction by limiting the misalignment to that direction scanned, the choice being one of a cost trade off. In addition, the amount of misalignment in each direction is also flexible since the scanning function may be provided with a variable amount of delay in each of the two directions, while the ultimate quality control of the inspection process may be independently established by selecting an appropriate mismatch threshold value.

The PIP system of the present invention also permits flexibility in the addition of a television monitor for independent viewing of the several video images in the system, such as monitoring the output of the exclusive OR 70 on the line 200 on a TV monitor to provide a video image of the exact locations of the mismatches between the referenced video image of the memory 74 and the image from the presently inspected subject. Also a television monitor may be used to monitor, through suitable switching means, a plurality of functions in the system, namely: the reference video image from the memory 74 on the line 102, the output video image from the scene scanner 104 on the line 107, and the digitized video image on the line 26. In addition, the use of a mask on the television camera 14 lens, allows for the inspection of only limited surface area imperfections, while errors outside of the area of interest are ignored. Similarly, although the invention has been shown and described with respect to illustrative embodiments thereof, it should be understood by those skilled in the art that the foregoing and various other changes, omissions and additions in the form and detail thereof may be made therein without departing from the spirit and the scope of the invention.

Having thus described a typical embodiment of my invention, that which I claim as new and desire to secure by Letters Patent is:

1. Apparatus for detecting dissimilarities between the video image of a standard subject aligned in a predetermined position in a field of view, and each of a plurality of video images of a plurality of similar subjects subsequently placed within the field of view without alignment, comprising:
   video means including a video source means having a field of view for providing, in each of a plurality of successive frames, a digital video image signal having a plurality of serial digital bits representative of the video image of a subject in said field of view;
   serial memory means having an input and an output and operated in synchronism with said video means;
   gate means for generating a gate signal indicating that the pattern subject is aligned within said field of view;
   switching means responsive to said video means, said gate means and the output of said memory means, and selectably operable in response to said gate signal to connect said video means to the input of said memory means, thereby to store a selected one of said digital video image signals representative of the pattern subject when aligned in a predetermined position within said field of view, and otherwise operable, in the absence of said select gate signal, to connect the output of said memory to the input thereof, thereby to provide continuous recirculation of the stored digital image signal through said memory means, once for each digital video image signal from said video means;
   scanning means, operating in synchronism with said video means and the output of said memory means, for delaying the digital bits of said stored digital image signal with respect to the digital bits of said digital video signals from said video means, in cumulative increments of an integral number of bits, the cumulative delay being increased by said integral number of bits for each successive frame of digital video image signals of a single subject within said field of view, to provide a proportionate displacement of said stored digital video signal with respect to successive ones of said plurality of digital video image signals of a single subject provided by said conversion means; and
   comparison means responsive to said video means and to said scanning means, for comparing the digital bits of each digital video image signal to digital bits corresponding in time therewith from the delayed stored video signal provided by said scanning means, and for providing a signal manifestation thereof.

2. Apparatus according to claim 1, wherein:
   said plurality of serial digital bits of each of said digital video image signals provided by said video means are arranged in a plurality of groups, each of said groups of digital bits being representative of a first one of two orthogonal coordinates of the video image of a subject in said field of view; and
   said integral number is one, whereby said scanning means provides scanning of said stored digital video image in said first coordinate.

3. Apparatus according to claim 1, wherein:
   said plurality of serial digital bits of each of said digital video image signals provided by said video means are arranged in a plurality of groups, each of said groups of digital bits being representative of a first one of two orthogonal coordinates of the video image of a subject in said field of view; and
   said integral number is equal to the number of bits in each of the said groups, whereby said scanning means provides scanning of said stored digital video image in the second one of said coordinates.

4. Apparatus according to claim 1, wherein:
   said plurality of serial digital bits of each of said digital video image signals provided by said video means are arranged in a plurality of groups, each of said groups of digital bits being representative of a first one of two orthogonal coordinates of the video image of a subject in said field of view; and
   wherein said scanning means sequentially delays the digital bits of said stored digital image signal in cumulative increments equal to the number of bits in each of said groups after first delaying the stored digital video image signal by some number of bits in cumulative increments of one bit.

5. In a method for optically comparing each of a plurality of objects to a pattern object without alignment of other than the pattern object in the field of view of optical comparison means, the steps of:
   aligning a pattern object within a predetermined portion of the field of view of video means that provides, in each of a succession of frames, a digital video image signal, comprising a plurality of serial digital bits, representative of the image of the object in its field of view;

storing the digital video image signal of said pattern object in a serial memory operated synchronously with said video means, placing another object within any portion of the field of view of the video means;

delaying the output of said memory means, in cumulative increments of an integral number of bits, the cumulative delay being increased by said integral number of bits for each successive frame of video image relating to each object within the field of view to provide a proportionate displacement of said stored digital video signal with respect to succeeding ones of said plurality of digital video image signals of each object; and comparing the digital bits of successive digital video image signals for each object placed within the field of view without alignment with the delayed stored digital bits of the pattern object and providing a signal manifestation thereof.

* * * * *